United States Patent
Latheef

(10) Patent No.: US 11,510,156 B2
(45) Date of Patent: Nov. 22, 2022

(54) APPARATUS AND METHOD FOR DYNAMIC POWER MANAGEMENT IN WIRELESS COMMUNICATION SYSTEM

(71) Applicant: Samsung Electronics Co., Ltd., Suwon-si (KR)

(72) Inventor: Fasil Abdul Latheef, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/271,412

(22) PCT Filed: Aug. 29, 2019

(86) PCT No.: PCT/KR2019/011088
§ 371 (c)(1),
(2) Date: Feb. 25, 2021

(87) PCT Pub. No.: WO2020/046017
PCT Pub. Date: Mar. 5, 2020

(65) Prior Publication Data
US 2021/0314883 A1    Oct. 7, 2021

(30) Foreign Application Priority Data

Aug. 29, 2018  (IN) .............................. 201841032395
Aug. 28, 2019  (IN) ............................ 2018 41032395

(51) Int. Cl.
*H04W 52/36* (2009.01)

(52) U.S. Cl.
CPC ....... *H04W 52/365* (2013.01); *H04W 52/367* (2013.01)

(58) Field of Classification Search
CPC .. H04W 52/365; H04W 52/367; H04W 88/06
(Continued)

(56) References Cited

U.S. PATENT DOCUMENTS

2013/0010704 A1*  1/2013  Kronquist ............. H04W 52/50
                                                        370/329
2013/0029657 A1*  1/2013  Gao ................... H04W 74/0833
                                                        455/422.1
(Continued)

FOREIGN PATENT DOCUMENTS

JP      2016-532326 A    10/2016
WO      2014/109687 A1    7/2014
WO      2018/057868 A2    3/2018

OTHER PUBLICATIONS

3rd Generation Partnership Project; Technical Specification Group Radio Access Network; NR; Physical layer procedures for control (Release 16); 3GPP TS 38.213 V16.4.0 (Dec. 2012).
(Continued)

*Primary Examiner* — John J Lee
(74) *Attorney, Agent, or Firm* — Jefferson IP Law, LLP

(57) ABSTRACT

The disclosure relates to a pre-5$^{th}$-Generation (5G) or 5G communication system to be provided for supporting higher data rates Beyond 4$^{th}$-Generation (4G) communication system such as long term evolution (LTE). The disclosure provides a method for sending a power headroom report (PHR) to a base station in a multi-rat dual connectivity (MR-DC) deployment in a UE (100). The method comprises determining, by the UE (100), that a transmit power required is greater than a maximum transmit power of the UE (100) and determining, by the UE (100), a PHR reporting criteria is met. The method also includes performing, by the UE (100) at least one of: modifying the power headroom such that the transmit power is less than or equal to the maximum transit power of the UE (100); modifying the maximum transmit power such that the power headroom report indicates that the transmit power required is less than or equal to the maximum transmit power and triggering the power
(Continued)

headroom report to the base station; and delaying the triggering and reporting of PHR to the base station.

18 Claims, 4 Drawing Sheets

(58) Field of Classification Search
USPC .......................................... 455/522, 515, 69
See application file for complete search history.

(56) References Cited

U.S. PATENT DOCUMENTS

| | | | |
|---|---|---|---|
| 2016/0112966 A1 | 4/2016 | Jung et al. | |
| 2017/0019864 A1 | 1/2017 | Hwang et al. | |
| 2018/0110013 A1* | 4/2018 | Semaan | H04W 52/365 |
| 2018/0167889 A1* | 6/2018 | Rajagopal | H04W 52/146 |

OTHER PUBLICATIONS

ITL Inc., "Remaining issue on PHR MAC CE for Dual Connectivity", 3GPP TSG RAN WG2 Meeting #87, Dresden, Germany, Aug. 18-22, 2014, R2-143446.
Indian Office Action dated Sep. 22, 2021, issued in Indian Application No. 201841032395.

* cited by examiner

APPARATUS AND METHOD FOR DYNAMIC POWER MANAGEMENT IN WIRELESS COMMUNICATION SYSTEM

CROSS-REFERENCE TO RELATED APPLICATION(S)

This application is a U.S. National Stage application under 35 U.S.C. § 371 of an International application number PCT/KR2019/011088 filed on Aug. 29, 2019, which is based on and claims the benefit priority of an Indian patent application number 201841032395, filed on Aug. 29, 2018, and an Indian patent application number 201841032395, filed on Aug. 28, 2019, in the Indian Intellectual Property Office, the disclosure of each of which is incorporated by reference herein in its entirety.

TECHNICAL FIELD

The disclosure relates to uplink power management in a wireless communication, and more specifically to a method and system for dynamic Power management for multiple radio access technology (RAT) dual capability (MR-DC) devices not supporting dynamic power sharing capability (DPS).

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

user equipment (UE) may or may not support dynamic power sharing (DPS). The DPS refers to a condition where the UE supports simultaneous long term evolution (LTE) and new radio (NR) transmission in a LTE-NR dual connectivity (DC). The UE can support simultaneous LTE and NR transmission in LTE-NR DC only when the sum of the configured power for LTE transmission ($P_{LTE}$) and configured power for NR transmission ($P_{NR}$) is equal or less than total power of the UE ($P_{total}$). If the sum of the configured $P_{LTE}$ and $P_{NR}$ is more than $P_{total}$, then the UE can only operate with time division multiplexing (TDM) based single uplink UL transmission (SUO).

Irrespective of the UE capability to support the DPS, if the UE is configured with $P_{LTE}+P_{NR}>P_{total}$, then the UE has to determine transmission power and transmission occasion on a secondary cell group (SCG). The SCG relates to a group of serving cells associated with a Secondary radio access network (RAN) node.

In scenario where the UE does not support DPS, the UE falls back into a SUO mode based on TDM pattern when $P_{LTE}+P_{NR}>P_{total}$. This fallback to SUO or TDM pattern happens based on network configuration of reference TDM pattern on LTE depending upon network knowledge of power headroom (PHR) from the UE for both the LTE and NR. The fallback of the UE to SUO impacts the UE performance, as there may be Protocol data unit (PDU) sessions or evolved packet switched system (EPS) bearers or services that are being served only by the SCG.

The data rate of the services being handled get affected as only one RAT can transmit at a time and the power required for transmission over a single RAT may still be below the maximum power which results into underutilization of power of the UE. The user plane (UP) and control plane (CP) latency get affected. UP latency gets affected more adversely as services like ultra reliable low latency communications (URLLC) are better served over NR and the international telecommunication union (ITU) requirement of 1 ms cannot be met as the TTI on LTE is larger as compared to NR and NR is denied transmission opportunity for at least a minimum of 1 TTI due to fall back into SUO.

DISCLOSURE OF INVENTION

Technical Problem

An aspect of the embodiments herein is to provide a method and system for modifying the power headroom such that the power headroom is less than or equal to the maximum transit power of the UE.

Another aspect of the embodiment herein is to determine a transmit power required for transmission of data by the UE over a first radio access technology (RAT) and a second RAT.

Another aspect of the embodiment herein is to determine a power headroom based on the transmit power required for transmission of data over the first Radio Access Technology (RAT) and the second RAT.

Another aspect of the embodiment herein is to determine that the transmit power required is greater than a maximum transmit power of the UE.

Another aspect of the embodiment herein is to determine by the UE whether a PHR reporting criteria is met.

Another aspect of the embodiment herein is to modify the power headroom such that the transmit power is less than or equal to the maximum transit power of the UE.

Another aspect of the embodiment herein is to modify the maximum transmit power such that the power headroom report indicates that the transmit power required is less than or equal to the maximum transmit power of the UE and triggering the power headroom report to the base station.

Another aspect of the embodiment herein is to delay the triggering and reporting of PHR to the base station.

Solution to Problem

Accordingly the disclosure provides a method and system for sending a power headroom report (PHR) to a base station in a multi-rat dual connectivity (MR-DC) deployment in a UE. The method comprises determining by the UE a transmit power required for transmission of data by the UE over a first radio access technology (RAT) and a second RAT supported by the UE. The method further includes determining, by the UE, a power headroom based on the transmit power required for transmission of data by the UE over the first radio access technology (RAT) and the second RAT supported by the UE. The method also includes determining, by the UE, that the transmit power required is greater than a maximum transmit power of the UE and determining, by the UE, a PHR reporting criteria is met. The method also includes performing by the UE one of: modifying the power headroom such that the transmit power is less than or equal to the maximum transit power of the UE; modifying the maximum transmit power such that the power headroom report indicates that the transmit power required is less than or equal to the maximum transmit power of the UE and triggering the power headroom report to the base station; and delaying the triggering and reporting of PHR to the base station.

In an embodiment the UE does not support dynamic power sharing. In another embodiment the first RAT is a long term evolution (LTE) technology and the second RAT is a new radio (NR). In yet another embodiment the first RAT is a new radio (NR) and the second RAT is a long term evolution (LTE) technology.

In an embodiment determining that the PHR reporting criteria is met, comprises identifying, by the UE that an ultra reliable low latency communication (URLLC) data is available for transmission, or identifying, by the UE that the URLLC data is not available for transmission, determining, by the UE (100), that a uplink (UL) grant is configured by the UE and a uplink block error rate (BLER) is less than a BLER value configured by the UE (100), or identifying, by the UE, that the URLLC data is not available for transmission, determining, by the UE (100), that the UL grant is not configured by the UE, a data rate on the second RAT is greater than a data rate configured by the UE, a buffer status report (BSR) history is greater than a BSR value configured by the UE and a uplink BLER is less than a BLER value configured by the UE or identifying, by the UE, that the URLLC data is not available for transmission, determining, by the UE, that the UL grant is not configured by the UE, the data rate on the second RAT is greater than the data rate configured by the UE, the BSR history is less than the BSR value configured by the UE, the UE is not in a cell edge of the second RAT and the uplink BLER is less than the BLER value configured by the UE.

In an embodiment the URLLC data is identified based on at least one of single network slice selection assistance information (S-NSSAI) indicating URLLC service, a service request sent by UE for URLLC service, a large subcarrier spacing numerology configured for a logical channel group (LCG), a presence of the configured UL grant configured by the UE, a presence of an activated PDCP duplication, a non-zero buffer status for the related LCG, and an average BSR wherein the LCG is greater than the BSR value configured by the UE.

In another embodiment identifying the URLLC data based on the subcarrier spacing numerology configured for LCG comprises performing, by the UE one of: determining a data transmission ongoing on a logical channel ID (LCID) for the LCG; determining that a LCID has a positive value of Bj and is contributing to BSR on the corresponding LCG; and determining that the BSR history on the LCG associated with the LCID is greater than the BSR value configured by the UE.

In another embodiment modifying the maximum transmit power comprises restricting the maximum transmit power limit of the UE (100) on at least one of the first RAT and the second RAT and triggering, by the UE, a power headroom report to the network, to indicate the restricted power available on the at least one of the first RAT and the second RAT.

In yet another embodiment triggering the power headroom report to the network, comprises identifying, by the UE, an amount of power that has to be restricted on at least one of the first RAT and the second RAT; triggering, by the UE the power headroom report indicating the power restriction on at least one of the first RAT and the second RAT, based on the restriction of the maximum transmit power limit; and starting by the UE, a preconfigured prohibit timer to prohibit new trigger of power headroom due to restricted maximum transmit power on at least one of the first RAT and the second RAT.

In another embodiment, delaying the triggering and reporting of PHR to the base station comprises delaying the triggering of PHR, in response to determining one of: a data pending for transmission is less than a preconfigured data value by the UE; the uplink BLER associated with at least one of the first RAT and the second RAT is higher than the BLER value preconfigured in the UE, there is a configured UL grant available in an associated transition time interval, a URLLC data is available for transmission, and an SR sent is available for logical channels mapped on low latency data.

In yet another embodiment modifying the PHR comprises adjusting the allowed maximum transmit power for the current transmission occasion of the UE on at least one of the first RAT and the second RAT.

In another embodiment the transmission occasion is an uplink transmission occasion where transmission resource is available on both of the first RAT and second RAT.

In an embodiment the BSR is based on at least one of: an average BSR value on a logical channel group (LCG), where the average BSR value is greater than the BSR value configured by the UE; a frequency with which a regular BSR is triggered over a defined period of time, where the frequency is greater than a frequency value configured by the UE; a number of PDCP SDUs that are received from the upper layers over a defined period of time, where the number of PDCP SDUs is greater than a PDCP SDUs value configured by the UE; and a number of PDCP packets with associated discard timer, wherein the PDCP packets are to be discarded based on the discard timer.

In yet another embodiment the BLER history is based on at least one of: an average uplink BLER of all configured LCID mapped to data radio bearers (DRBs), where the average uplink BLER is greater than the average uplink BLER value configured by the UE, an average uplink BLER of at least one configured LCID mapped to DRBs, where the average uplink BLER is greater than an average uplink BLER value configured by the UE and where the LCID is belonging to one of URLLC service; or high data rate activity; an average uplink BLER of at least one HARQ process with the average uplink BLER is greater than the average uplink BLER configured by the UE (100); and an average uplink BLER of at least one slot with the average uplink BLER greater than the average uplink BLER configured by the UE.

Accordingly the invention provides a UE for sending a power headroom report (PHR) to a base station in a multi-rat dual connectivity (MR-DC) deployment, the UE comprising: a memory and a processor coupled to the memory. The processor is configured to determine a transmit power required for transmission of data by the UE (100) over a first radio access technology (RAT) and a second RAT supported by the UE, determine a power headroom based on the transmit power required for transmission of data by the UE over the first radio access technology (RAT) and the second RAT supported by the UE; determine that the transmit power required is greater than a maximum transmit power of the UE; determine that a PHR reporting criteria is met. The UE is further configured to perform at least one of: modify the power headroom such that the transmit power is less than or equal to the maximum transit power of the UE; modify the maximum transmit power such that the power headroom report indicates that the transmit power required is less than or equal to the maximum transmit power of the UE and triggering the power headroom report to the base station; and delay the triggering and reporting of PHR to the base station These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

Various embodiments of the disclosure provide a power management scheme that is more effective.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which.

BEST MODE FOR CARRYING OUT THE INVENTION

Figure 1:
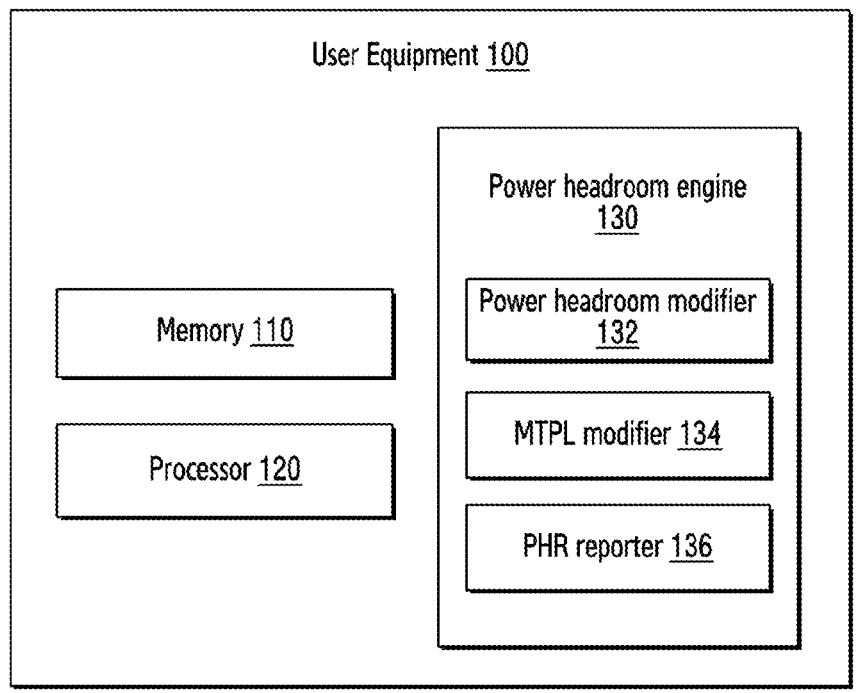
FIG. 1 is a block diagram of a UE for sending a power headroom report to a base station, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The embodiments herein provide a method and system for sending a power headroom report (PHR) to a base station in a multi-radio access technology (RAT) dual connectivity (MR-DC) deployment in a UE. The method comprises determining, by the UE, power headroom required for transmission of data by the UE over a first RAT and a second RAT supported by the UE. The method further determines whether the power headroom is greater than a maximum transit power of the UE. The Method further comprises determining, by the UE that power headroom report (PHR) reporting criteria is met. The method further includes, modifying by the UE the power headroom such that the power headroom is less than or equal to the maximum transit power of the UE. The method comprises modifying a maximum transmit power level (MTPL) such that the power headroom is less than or equal to the maximum transit power of the UE and triggering the power headroom to the base station. In another embodiment the method comprises delaying the triggering and reporting of PHR to the base station.

Unlike conventional methods and systems, with the proposed method, the URLLC services can be transmitted within the expected user plane latency. The proposed method also provides better uplink (UL) data rate due to simultaneous UL transmission opportunity. General user plane latency is improved compared to single UL for split bearers. Better quality of service (QoS) maintenance is ensured with the proposed method as the packets are buffered at packet data convergence protocol (PDCP) for a shorter duration and hence lesser PDCP discards. Better uplink resource utilization is achieved and resource omission is also reduced for the cases where configured UL grant or grant free transmission is possible. The power consumption for short burst traffic is also reduced due to longer availability of two UL paths.

Referring now to the drawings, and more particularly to FIGS. 1 through 4, where similar reference characters denote corresponding features consistently throughout the figures, there are shown preferred embodiments.

FIG. 1 represents a block diagram of a UE 100 for sending a power headroom report (PHR) to a base station, according to an embodiment as disclosed herein. The UE 100 can be, for example, but not limited to a cellular phone, a smart phone, a personal digital assistant (PDA), a tablet computer, a laptop computer, a smart social robot, a smart watch, a music player, a video player, an internet of things (IoT) device or the like. The base station can be, for example, but not limited to a gnb.

In an embodiment, the UE 100 includes a memory 110, a processor 120 and a power headroom engine 130. The power headroom engine 130 is coupled with the memory 110 and the processor 120 and is responsible for sending power headroom reports of the UE 100 to a base station at the network side.

In an embodiment the power headroom engine 130 determines power headroom required for transmission of data by the UE 100 over a first radio access technology (RAT) ($P_L$) and a second RAT ($P_N$) supported by the UE 100 wherein the first RAT refers to the LTE and the second RAT refers to the NR. The power headroom of the UE 100 represent a transmission power available in UE 100 in addition to power being used in the current transmission by the UE 100. The UE 100 sends the power headroom values to the base station in a form of a power headroom report (PHR). Based on the PHR received by the base station, the uplink bandwidth required by the UE 100 for a specific sub frame is estimated. The PHR is transmitted based on a periodic or other event triggers by media access control (MAC) associated with the UE. The PHR makes the network aware of the maximum number of resource blocks that can be allocated at a time based on the amount of power available for transmission.

In an embodiment the power headroom engine 130 determines that the power headroom required for transmission over LTE and NR by the UE 100 is greater than a total power ($P_{Total}$) of the UE 100. The power headroom engine 130 also determines whether a power headroom reporting criteria is met.

In an embodiment the power headroom engine comprises a power headroom modifier 132, a MTPL modifier 134, and a PHR reporter 136.

In an embodiment, the power headroom modifier 132 modifies the power headroom of the UE 100 depending upon the power headroom reporting criteria such that the power headroom required for transmission over LTE ($P_L$) and NR ($P_N$) by the UE 100 is less than or equal to the total ($P_{total}$) of the UE 100 (($P_L+P_N$)≤$P_{Total}$).

In an embodiment, the MTPL modifier 134 modifies a maximum transmit power level (MTPL) based on the power headroom reporting criteria, such that the power headroom is less than or equal to the maximum transit power ($P_{total}$) of the UE 100 and triggers the power headroom to a base station.

In an embodiment the PHR reporter 136 delays a triggering and reporting of the PHR to the base station based on the power headroom reporting criteria.

The processor 120 is configured to execute instructions stored in the memory 110 and to perform various processes. The memory 110 stores instructions to be executed by the processor 120. The memory 110 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 110 may, in some examples, be considered a non-transitory storage medium. The term "non-transitory" may indicate that the storage medium is not embodied in a carrier wave or a propagated signal. However, the term "non-transitory" should not be interpreted that the memory 110 is non-movable. In some examples, the memory 110 can be configured to store larger amounts of information than the memory. In certain examples, a non-transitory storage medium may store data that can, over time, change (e.g., in random access memory (RAM) or cache).

Although the FIG. 1 shows various hardware components of the UE100 but it is to be understood that other embodiments are not limited thereon. In other embodiments, the electronic device 100 may include less or more number of components. Further, the labels or names of the components are used only for illustrative purpose and does not limit the scope of the invention. One or more components can be combined together to perform same or substantially similar function to handle the multi pipe creation in the wireless communication system.

Figure 2:
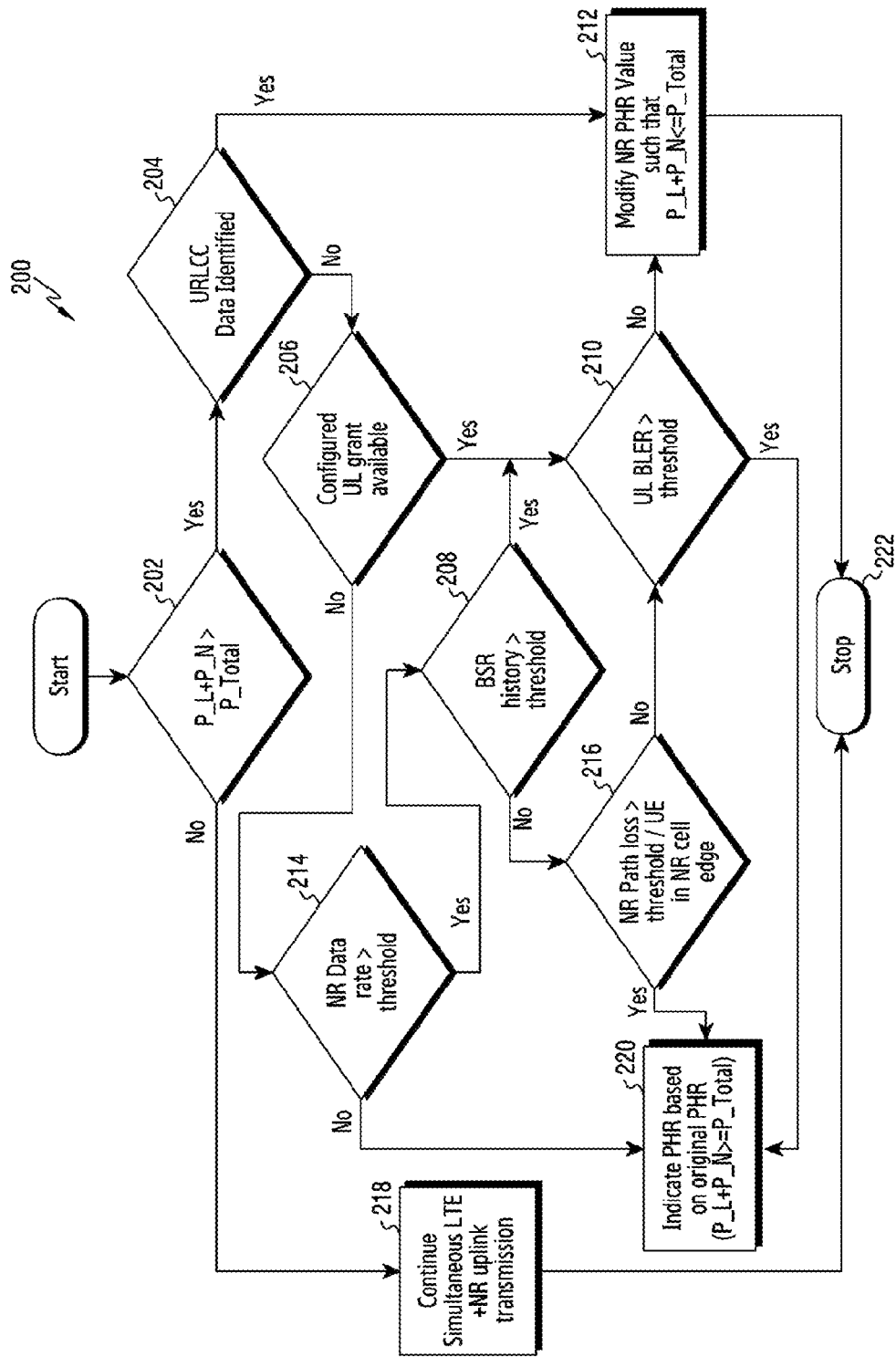
FIG. 2 is a flow diagram illustrating a method to modify the power headroom for the UE, according to an embodiment as disclosed herein.

FIG. 2 is a flow chart 200 illustrating a method to modify the power headroom for the UE, according to an embodiment as disclosed herein. The operations (202-222) are performed by the power headroom engine 130. At 202 the power headroom engine 130 determines whether the power required for transmission over the LTE ($P_L$) and power required for transmission over the NR ($P_N$) is greater than the total power of the UE 100 which is $P_L+P_N>P_{Total}$. If the condition $P_L+P_N>P_{Total}$ is satisfied then at 204, the power headroom engine 130 determines whether a URLCC data is identified. URLLC data refers to ultra reliable low latency communications. In an example scenario, the URLLC data may be an instruction for autonomous driving of vehicle and the like. The URLLC data If the condition $P_L+P_N>P_{Total}$ is not satisfied then at 218, the method continues simultaneous uplink transmission over the LTE and the NR. At 204, if the URLLC data is identified then at 212 the method modifies a NR power headroom value such than $P_L+P_N=P_{Total}$. If the URLLC data is not identified at 204, then the flow determines whether a UL grant is available for transmission or not at 206. If the UL grant is available then at 210 the method determines whether a UL block error rate (BLER) is greater than a value ($T_{BLER}$) configured by the UE for the UL BLER. The UL BLER is the ratio of the number of erroneous blocks received to the total number of blocks sent in a transmission. A UL BLER history may be defined based on any of the following metric or a combination of multiple metrics as mentioned below. The average UL BLER of the UE over a defined time period is greater than a preconfigured configured by the UE. Average UL BLER of all the configured LCID mapped to DRBs is greater than a preconfigured value configured by the UE over a period of time. Average UL BLER of any of the configured LCID mapped to DRBs is greater than a value configured by the UE over a period of time. LCID belonging to URLLC service. LCID on which high data rate activity is ongoing. Average UL BLER on UE or LCID is larger than a value configured by the UE_1 (low value) over a large period of time and the average UL BLER on UE or LCID is larger than a value configured by the UE_2 (large value, at least 2× value configured by the UE_1) over a short period of time (<0.5× of time for value configured by the UE_1 evaluation). Average UL BLER on a particular slot or symbol, or HARQ process is larger than a value configured by the UE over a defined period of time.

If the UL BLER is greater than $T_{BLER}$, then at 220 the method indicates the power headroom to the base station based on original power headroom such that $P_L+P_N>P_{Total}$. If the UL BLER is not greater than $T_{BLER}$, then at 212 the method modified the NR power headroom values such that $P_L+P_N<P_{Total}$.

In an embodiment if the UL grant is not available for transmission at 206, then the flow proceeds to 214. At 214 the method determines whether a NR data rate is greater than a predefined value configured by the UE ($T_{NR}$) for the NR data rate. If the NR data rate is not greater than the $T_{NR}$ the method proceeds to 220 and indicates the power headroom to the base station based on original power headroom such that $P_L+P_N>P_{Total}$. If the NR data rate is greater than the $T_{NR}$, then at 208, the flow determines whether a buffer status report (BSR) history is greater than a predefined value configured by the UE ($T_{BSR}$) BSR history. BSR history is computed based on the buffer status trigger frequency and the BSR value. The BSR history also takes the packet data convergence protocol (PDCP) service data unit (SDU) count into account. The BSR history may either be defined based on any of the following metric or based on a combination of multiple metrics as mentioned below. The BSR history depends on the average BSR value on the LCG configured to carry user traffic over a defined period of time (indicating continuous data session/uniform traffic) is greater than a predefined value configured by the UE. The frequency with which a regular BSR is triggered over a defined period of time (indicating multiple frequent data sessions/bursty traffic nature) is larger than a configured value configured by the UE. The number of PDCP SDUs that are received from the upper layers over a defined period of time is larger than a predefined value. Number of PDCP packets that are edging towards PDCP discard timer expiry and have not received RLC ACK for successful transmission (Valid only for RLC AM Mode) is greater than a value configured by the UE.

If the BSR history is greater than the $T_{BSR}$, then the method proceeds to 210 and the subsequent steps are followed. If the BSR history is not greater than the $T_{BSR}$ then at 216 the method determines whether a NR path loss is greater than a value configured by the UE value ($T_{pathloss}$) for the NR path loss. If the NR path loss is greater than the $T_{pathloss}$, then the method proceed to 220 and the subsequent are followed as discussed above. If the NR path loss is not greater than the $T_{pathloss}$, then the method proceed to 210 and the subsequent are followed as discussed above.

The various actions, acts, blocks, steps, or the like in the flow diagram 300 may be performed in the order presented, in a different order or simultaneously. Further, in some embodiments, some of the actions, acts, blocks, steps, or the like may be omitted, added, modified, skipped, or the like without departing from the scope of the invention.

Figure 3:
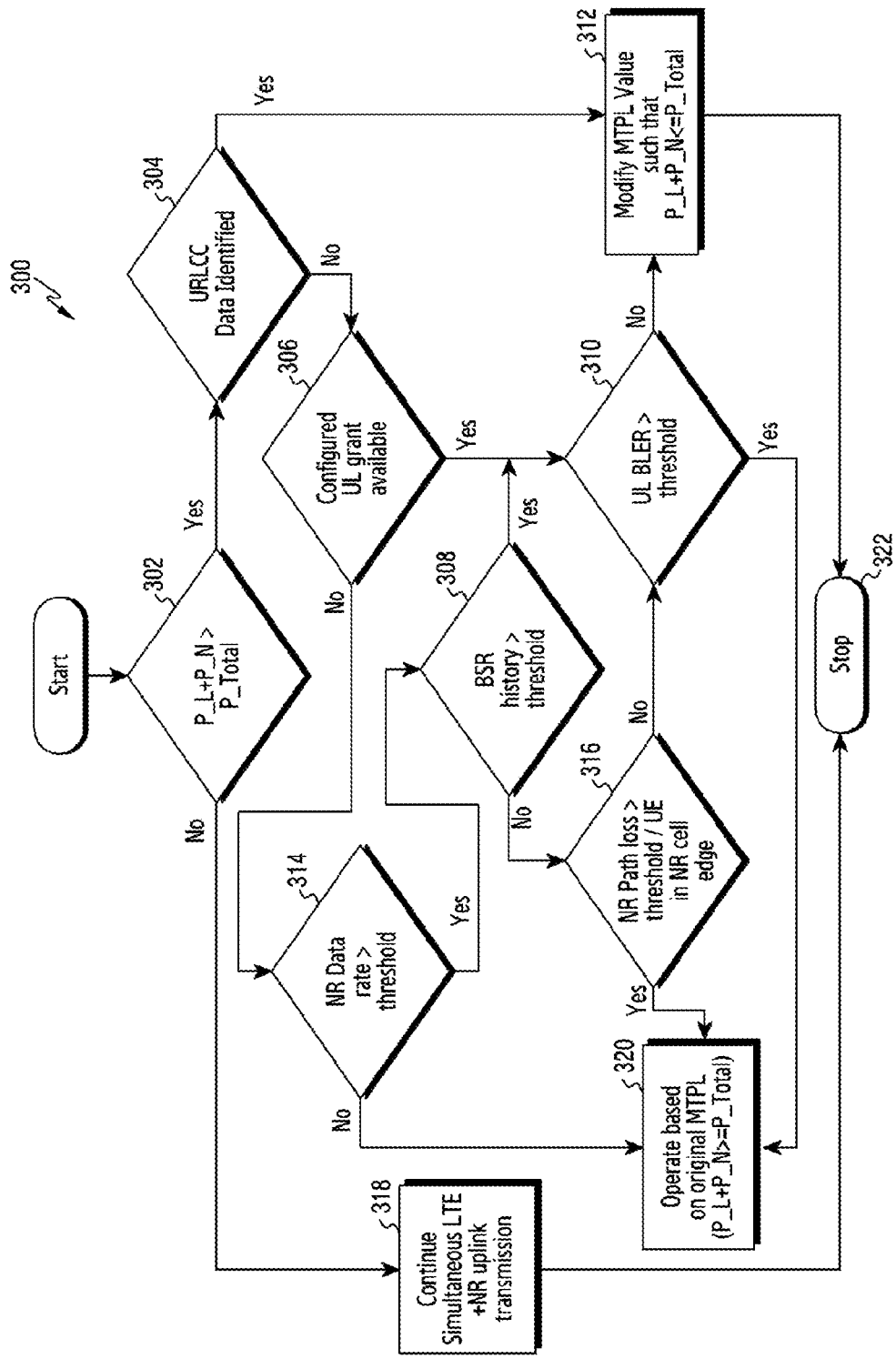
FIG. 3 is a flow diagram illustrating a method to modify a maximum transmit power level (MTPL) of the UE, according to an embodiment as disclosed herein.

FIG. 3 is a flow chart 300 to modify a MTPL such that the power headroom is less than or equal to the maximum transit power of the UE 100 and trigger the power headroom to a base station. The operations (302-322) are performed by the power headroom engine 130.

At 302, the method determines whether the power required for transmission over the LTE ($P_L$) and power required for transmission over the NR ($P_N$) is greater than the total power of the UE 100 which is $P_L+P_N>P_{Total}$. If the condition $P_L+P_N>P_{Total}$ is satisfied then at 304, the method determines whether a URLCC data is identified. If the condition $P_L+P_N>P_{Total}$ is not satisfied then at 318, the method continues simultaneous uplink transmission over the LTE and the NR. At 304, if the URLLC data is identified then at 312 the method modifies a maximum transmit power level (MTPL) value of the UE 100 such than $P_L+P_N<=P_{Total}$. If the URLLC data is not identified at 304, then the flow determines whether a UL grant is available for transmission or not at 306. If the UL grant is available then at 310 the method determines whether a UL bit error rate (BLER) is greater than a value configured by the UE value ($T_{BLER}$) for the UL BLER. If the UL BLER is greater than $T_{BLER}$, then at 320 the method performs its operation based on a original MTPL value such that $P_L+P_N>P_{Total}$. If the UL BLER is not greater than $T_{BLER}$, then at 312 the method modified the MTPL values such that $P_L+P_N<P_{Total}$.

In an embodiment if the UL grant is not available for transmission at 206, then the flow proceeds to 214. At 314 the method determines whether a NR data rate is greater than a value configured by the UE ($T_{NR}$) for the NR data rate. If the NR data rate is not greater than the $T_{NR}$ the method proceeds to 320 and performs its operation based on original MTPL value such that $P_L+P_N>P_{Total}$. If the NR data rate is greater than the $T_{NR}$, then at 308, the flow determines whether a BSR history is greater than a value configured by the UE ($T_{BSR}$) BSR history. If the BSR history is greater than the $T_{BSR}$, then the method proceeds to 310 and the subsequent steps are followed. If the BSR history is not greater than the $T_{BSR}$ then at 216 the method determines whether a NR path loss is greater than a value configured by the UE value ($T_{pathloss}$) for the NR path loss. If the NR path loss is greater than the $T_{pathloss}$, then the method proceed to 320 and the subsequent are followed as discussed above. If the NR path loss is not greater than the $T_{pathloss}$, then the method proceed to 310 and the subsequent are followed as discussed above.

The various actions, acts, blocks, steps, or the like in the flow diagram 300 may be performed in the order presented, in a different order or simultaneously. Further, in some embodiments, some of the actions, acts, blocks, steps, or the like may be omitted, added, modified, skipped, or the like without departing from the scope of the invention.

Figure 4:
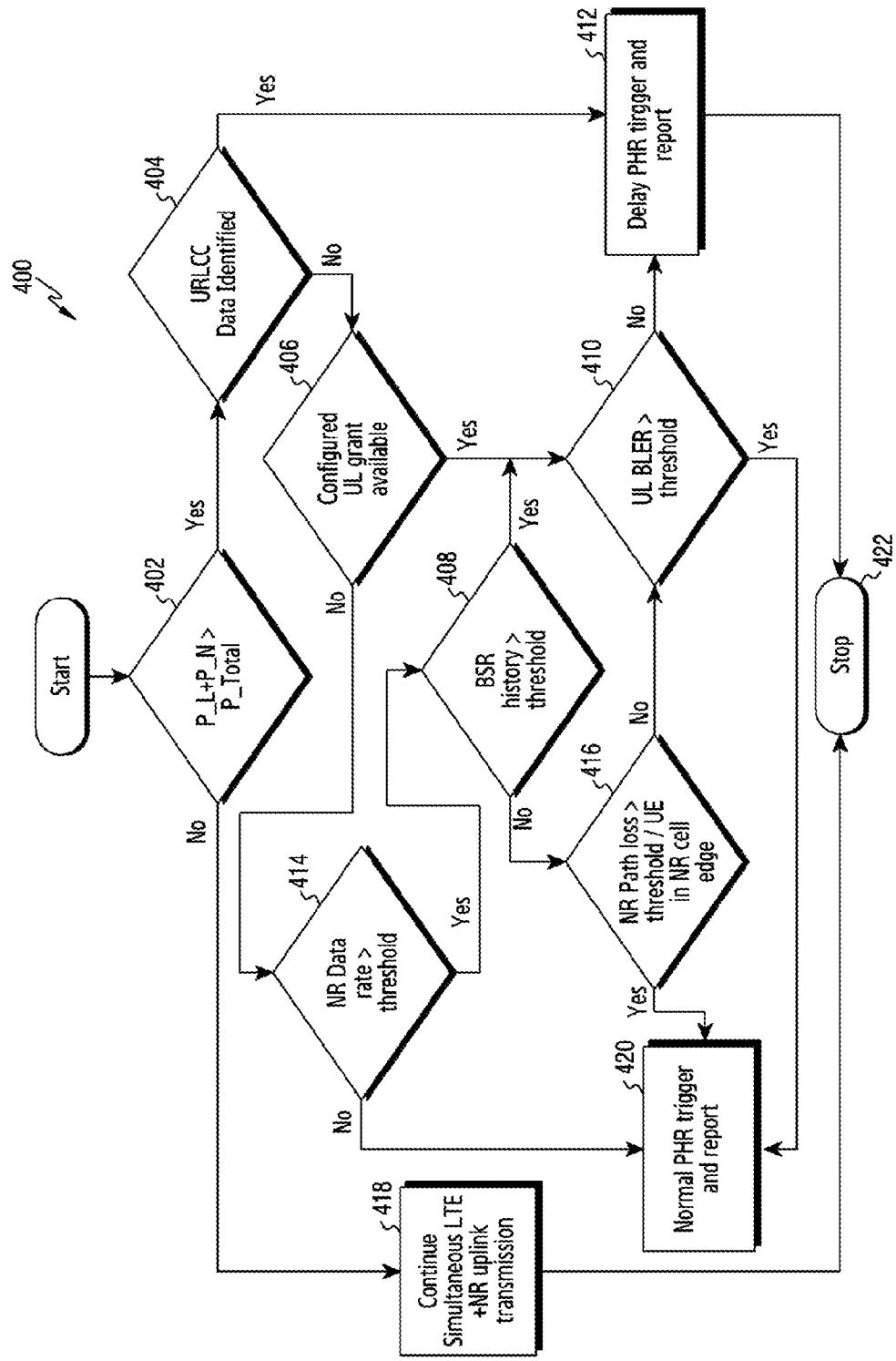
FIG. 4 is flow diagram illustrating a method to delay a triggering and reporting of the power headroom to a base station, according to an embodiment as disclosed herein.

FIG. 4 is a flow chart 300 for delaying a triggering and reporting of the power headroom to a base station. The operations (402-422) are performed by the power headroom engine 130.

At 402, the method determines whether the power required for transmission over the LTE ($P_L$) and power required for transmission over the NR ($P_N$) is greater than the total power of the UE 100 which is $P_L+P_N>P_{Total}$. If the condition $P_L+P_N>P_{Total}$ is satisfied then at 404, the method determines whether a URLCC data is identified. If the condition $P_L+P_N>P_{Total}$ is not satisfied then at 418, the method continues simultaneous uplink transmission over the LTE and the NR. At 3404, if the URLLC data is identified then at 412 the method delays a power headroom trigger and the power headroom values to the UE 100. If the URLLC data is not identified at 404, then the flow determines whether a UL grant is available for transmission or not at 406. If the UL grant is available then at 410 the method determines whether a UL bit error rate (BLER) is greater than a value configured by the UE value ($T_{BLER}$) for the UL BLER. If the UL BLER is greater than $T_{BLER}$, then at 420 the method performs its normal operation based on a normal Power headroom trigger and power headroom values. If the UL BLER is not greater than $T_{BLER}$, then at 412 the method modified the MTPL values such that $P_L+P_N<P_{Total}$.

In an embodiment if the UL grant is not available for transmission at 206, then the flow proceeds to 414. At 414 the method determines whether a NR data rate is greater than a value configured by the UE ($T_{NR}$) for the NR data rate. If the NR data rate is not greater than the $T_{NR}$ the method proceeds to 420 and performs its normal operation based on normal power headroom trigger and power headroom values. If the NR data rate is greater than the $T_{NR}$, then at 408, the flow determines whether a BSR history is greater than a value configured by the UE ($T_{BSR}$) BSR history. If the BSR history is greater than the $T_{BSR}$, then the method proceeds to 410 and the subsequent steps are followed. If the BSR history is not greater than the $T_{BSR}$ then at 416 the method determines whether a NR path loss is greater than a value configured by the UE ($T_{pathloss}$) for the NR path loss. If the NR path loss is greater than the $T_{pathloss}$, then the method proceed to 420 and the subsequent are followed as discussed above. If the NR path loss is not greater than the $T_{pathloss}$, then the method proceed to 410 and the subsequent are followed as discussed above.

The various actions, acts, blocks, steps, or the like in the flow diagram 400 may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented through at least one software program running on at least one hardware device and performing network management functions to control the elements. The elements shown in FIGS. 1-4 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by a user equipment (UE) in a wireless communication system, the method comprising:
   determining, by the UE, a transmit power required for transmission of data by the UE over a first radio access technology (RAT) and a second RAT supported by the UE;
   determining, by the UE, a power headroom based on the transmit power required for transmission of data by the UE over the first RAT and the second RAT supported by the UE;
   determining, by the UE, that the transmit power required is greater than a maximum transmit power of the UE;
   identifying, by the UE, that ultra reliable low latency communication (URLLC) data is available for transmission;
   in case that the URLLC data being available for transmission is identified, performing, by the UE, at least one of:
      modifying a power headroom report (PHR) such that the transmit power is less than or equal to the maximum transmit power of the UE,
      modifying the maximum transmit power such that the PHR indicates that the transmit power required is less than or equal to the maximum transmit power of the UE and triggering the PHR to a base station, or
      delaying the triggering and reporting of the PHR to the base station; and
   in case that the URLLC data being available for transmission is not identified, performing, by the UE, at least one of:
      determining that an uplink (UL) grant is configured by the UE,
      determining that an uplink block error rate (BLER) is less than a BLER value configured by the UE,
      determining that a data rate on the second RAT is greater than a data rate configured by the UE,
      determining that a buffer status report (BSR) history is greater than a BSR value configured by the UE, or
      determining that the UE is not in a cell edge of the second RAT.

2. The method of claim 1, wherein the UE does not support dynamic power sharing.

3. The method of claim 1,
   wherein one of the first RAT or the second RAT comprises long term evolution (LTE) technology, and
   wherein another one of the first RAT or the second RAT comprises new radio (NR) technology.

4. The method of claim 1, wherein the URLLC data is identified based on at least one of single network slice selection assistance information (S-NSSAI) indicating a URLLC service, a service request sent by the UE for the URLLC service, a large subcarrier spacing numerology configured for a logical channel group (LCG), a presence of the UL grant configured by the UE, a presence of an activated packet data convergence protocol (PDCP) duplication, a non-zero buffer status for a related LCG, or an average BSR value in which the LCG is greater than the BSR value configured by the UE.

5. The method of claim 4, wherein the identifying of the URLLC data based on the large subcarrier spacing numerology configured for LCG comprises performing, by the UE, one of:
   determining a data transmission ongoing on a logical channel identifier (LCID) for the LCG;
   determining that the LCID has a positive value of Bj and is contributing to BSR on a corresponding LCG; or
   determining that the BSR history on the LCG associated with the LCID is greater than the BSR value configured by the UE.

6. The method of claim 1, wherein the modifying of the maximum transmit power of the UE comprises:
   restricting a limit of the maximum transmit power of the UE on at least one of the first RAT or the second RAT; and
   triggering, by the UE, the PHR to a network to indicate a restricted power available on the at least one of the first RAT or the second RAT.

7. The method of claim 6, wherein the triggering of the PHR to the network comprises:
   identifying, by the UE, an amount of power that has to be restricted on at least one of the first RAT or the second RAT;
   triggering, by the UE, the PHR indicating the amount of power that has to be restricted on at least one of the first RAT or the second RAT, based on the restricting of the limit of the maximum transmit power; and starting, by the UE, a preconfigured prohibit timer to prohibit a new trigger of the PHR due to restricted maximum transmit power on at least one of the first RAT or the second RAT.

8. The method of claim 1, wherein the delaying of the triggering and reporting of the PHR to the base station comprises delaying the triggering of the PHR in response to determining one of:
   a data pending for transmission is less than a preconfigured data value by the UE;
   the uplink BLER associated with at least one of the first RAT or the second RAT is higher than the BLER value preconfigured in the UE;
   there is a configured UL grant available in an associated transition time interval;
   the URLLC data is available for transmission; or
   a status report (SR) sent is available for logical channels mapped on low latency data.

9. The method of claim 1, wherein the modifying of the PHR comprises adjusting an allowed maximum transmit power for a current transmission occasion of the UE on at least one of the first RAT or the second RAT.

10. The method of claim 9, wherein the current transmission occasion comprises an uplink transmission occasion in which a transmission resource is available on both of the first RAT and second RAT.

11. The method of claim 1, wherein the BSR is based on at least one of:
   an average BSR value on a logical channel group (LCG), where the average BSR value is greater than the BSR value configured by the UE;
   a frequency with which a regular BSR is triggered over a defined period of time, in which the frequency is greater than a frequency value configured by the UE;
   a number of packet data convergence protocol (PDCP) service data units (SDUs) received from upper layers over a defined period of time, in which the number of PDCP SDUs is greater than a PDCP SDUs value configured by the UE; or
   a number of PDCP packets with an associated discard timer, the PDCP packets being discarded based on the associated discard timer.

12. The method of claim 1, wherein the BLER value is based on at least one of:
   an average uplink BLER value of all configured logical channel identifiers (LCIDs) mapped to data radio bearers (DRBs), in which the average uplink BLER value of all configured LCIDs is greater than an average uplink BLER value configured by the UE;
   an average uplink BLER value of at least one configured LCID mapped to DRBs, in which the average uplink BLER value of the at least one configured LCID is greater than the average uplink BLER value configured by the UE and the at least one configured LCID belongs to one of a URLLC service or a high data rate activity;
   an average uplink BLER value of at least one hybrid automatic repeat request (HARQ) process, in which the average uplink BLER value of the at least one HARQ process is greater than the average uplink BLER configured by the UE; or
   an average uplink BLER value of at least one slot, in which the average uplink BLER value of the at least one slot is greater than the average uplink BLER configured by the UE.

13. A user equipment (UE) in a wireless communication system, the UE comprising:
   a transceiver; and
   at least one processor coupled to the transceiver and configured to:
      determine a transmit power required for transmission of data by the UE over a first radio access technology (RAT) and a second RAT supported by the UE,
      determine a power headroom based on the transmit power required for transmission of data by the UE over the first RAT and the second RAT supported by the UE,
      determine that the transmit power required is greater than a maximum transmit power of the UE,
      identify that ultra reliable low latency communication (URLLC) data is available for transmission,
      in case that the URLLC data being available for transmission is identified, perform at least one of:
         modify a power headroom report (PHR) such that the transmit power is less than or equal to the maximum transmit power of the UE;
         modify the maximum transmit power such that the PHR indicates that the transmit power required is less than or equal to the maximum transmit power of the UE and triggering the PHR to a base station; or
         delay the triggering and reporting of the PHR to the base station, and
      in case that the URLLC data being available for transmission is not identified, perform at least one of:
         determine that an uplink (UL) grant is configured by the UE;
         determine that an uplink block error rate (BLER) is less than a BLER value configured by the UE;
         determine that a data rate on the second RAT is greater than a data rate configured by the UE;
         determine that a buffer status report (BSR) history is greater than a BSR value configured by the UE; or
         determine that the UE is not in a cell edge of the second RAT.

14. The UE of claim 13, wherein the UE does not support dynamic power sharing.

15. The UE of claim 13,
   wherein one of the first RAT or the second RAT comprises long term evolution (LTE) technology, and
   wherein another one of the first RAT or the second RAT comprises new radio (NR) technology.

16. The UE of claim 13, wherein the URLLC data is identified based on at least one of single network slice selection assistance information (S-NSSAI) indicating a URLLC service, a service request sent by the UE for the URLLC service, a large subcarrier spacing numerology configured for a logical channel group (LCG), a presence of the UL grant configured by the UE, a presence of an activated packet data convergence protocol (PDCP) duplication, a non-zero buffer status for a related LCG, or an average BSR value in which the LCG is greater than the BSR value configured by the UE.

17. The UE of claim 16, wherein, for identifying the URLLC data based on the large subcarrier spacing numerology configured for the LCG, the at least one processor is further configured to one of:
   determine a data transmission ongoing on a logical channel identifier (LCID) for the LCG,
   determine that the LCID has a positive value of Bj and is contributing to BSR on a corresponding LCG, or determine that the BSR history on the LCG associated with the LCID is greater than the BSR value configured by the UE.

18. The UE of claim 13, wherein, for modifying the maximum transmit power of the UE, the at least one processor is further configured to:
   restrict a limit of the maximum transmit power of the UE on at least one of the first RAT or the second RAT, and
   trigger, by the UE, the PHR to a network, to indicate a restricted power available on the at least one of the first RAT or the second RAT.

* * * * *